(12) United States Patent
Steingrebe et al.

(10) Patent No.: US 6,527,325 B2
(45) Date of Patent: Mar. 4, 2003

(54) PULL-DOWN STOWAGE BIN RESTRAINT

(75) Inventors: Martin L. Steingrebe, Bellingham, WA (US); James J. Ahlfs, Bellingham, WA (US)

(73) Assignee: Britax Health Tecna Inc., Bellingham, WA (US)

( * ) Notice: Subject to any disclaimer, the term of this patent is extended or adjusted under 35 U.S.C. 154(b) by 0 days.

(21) Appl. No.: 09/773,279

(22) Filed: Jan. 30, 2001

(65) Prior Publication Data

US 2002/0101090 A1 Aug. 1, 2002

(51) Int. Cl.⁷ ............................................. B64D 11/00
(52) U.S. Cl. .................. 296/37.7; 296/37.8; 244/118.1; 244/118.5; 312/248; 312/266
(58) Field of Search ............................. 296/37.8, 37.9, 296/37.7; 312/248, 328, 245, 246, 327, 266; 244/118.1, 118.5; 224/29.5, 282, 309, 311, 324, 328

(56) References Cited

U.S. PATENT DOCUMENTS

| | | | | |
|---|---|---|---|---|
| 2,048,363 A | * | 7/1936 | Vogel | 224/280 |
| 4,907,762 A | | 3/1990 | Bock et al. | |
| 5,035,471 A | * | 7/1991 | Ackerman | 312/291 |
| 5,383,628 A | * | 1/1995 | Harriehausen et al. | 244/118.1 |
| 5,868,353 A | * | 2/1999 | Benard | 244/118.1 |
| 5,988,565 A | * | 11/1999 | Thomas et al. | 244/118.1 |

* cited by examiner

Primary Examiner—D. Glenn Dayoan
Assistant Examiner—Patricia Engle
(74) Attorney, Agent, or Firm—Christensen O'Connor Johnson Kindness PLLC

(57) ABSTRACT

A pull-down stowage bin assembly (10) for a vehicle includes a frame (14), a bin (12) coupled to the frame for reciprocative movement between an open position and a stowed position, and a restraint assembly (20) disposed within the bin to selectively restrain objects located within the bin when objects are located in the bin and the bin is in the open position.

13 Claims, 3 Drawing Sheets

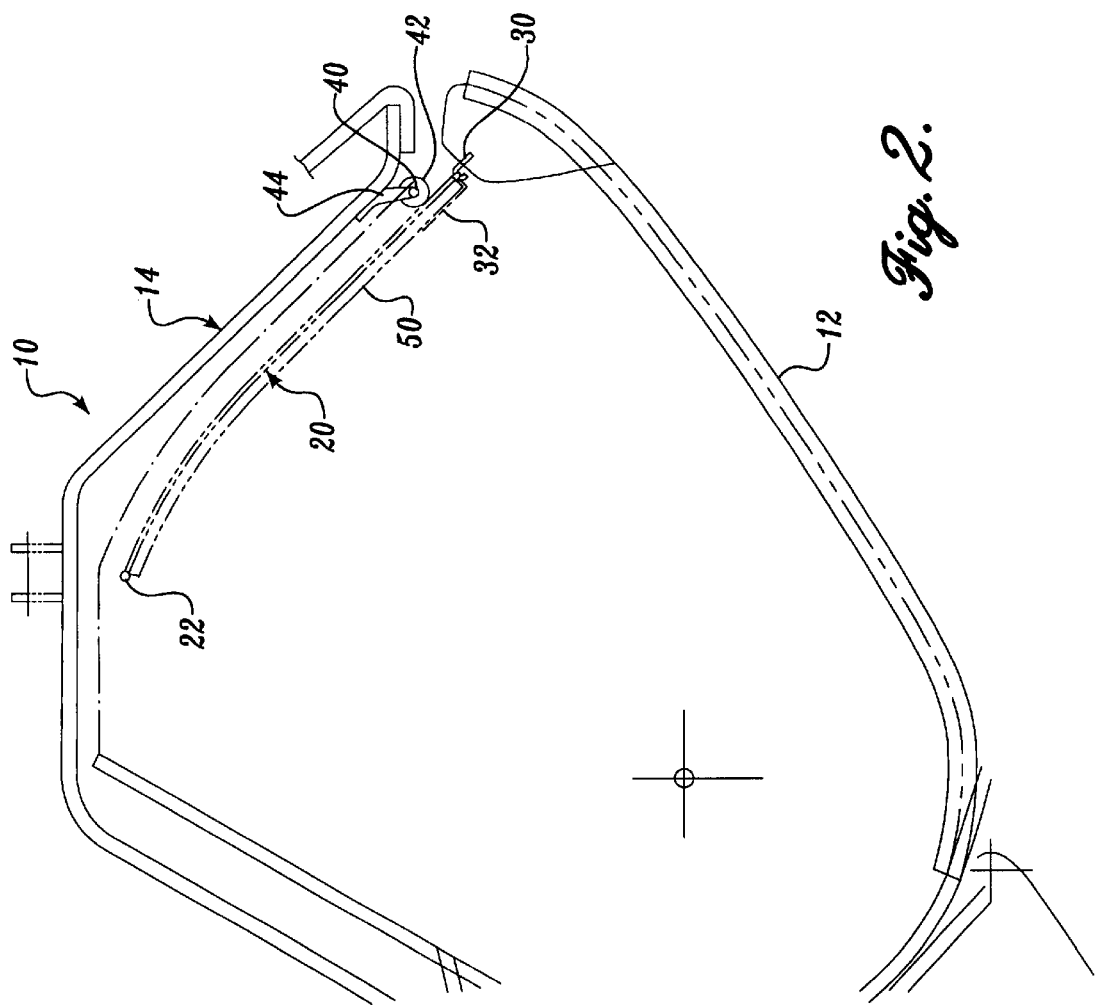

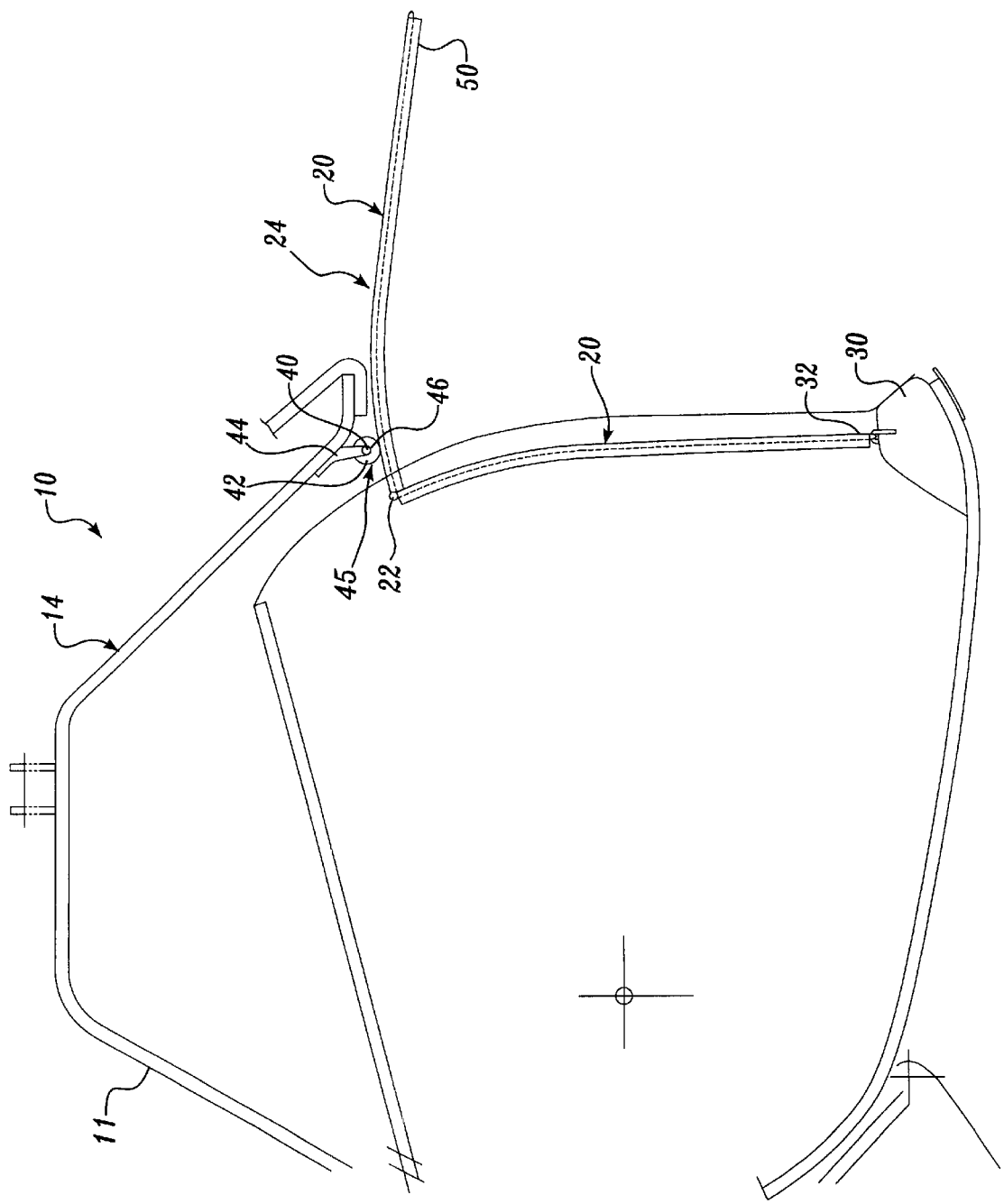

PULL-DOWN STOWAGE BIN RESTRAINT

FIELD OF THE INVENTION

The invention relates generally to pull down stowage bins and, more particularly, to an apparatus for restraining items in a stowage bin.

BACKGROUND OF THE INVENTION

Pull-down bucket stowage bins are commonly used to stow luggage in vehicles having a passenger compartment, such as buses and commercial aircraft. Typically, such stowage bins are reciprocally mounted to or near the ceiling of the passenger compartment, such that they are located above rows of passenger seats within the vehicle. As mounted, the bins may be reciprocated between an open position, wherein items may be placed within the bin, and a closed position to stow items located within the bin. Although overhead stowage bins are effective at stowing items, such as luggage, they are not without problems.

As an example, luggage stowed within an overhead luggage bin of an aircraft may shift to an unstable position during takeoff or landing of the aircraft or if the aircraft encounters turbulence during flight. As a result, when the luggage bin is opened, the luggage may unexpectedly fall out into the passenger compartment, thereby potentially injuring persons located within the passenger compartment. Thus, such a bin poses a potential hazard.

Therefore, there exists a need for a restraint apparatus for an overhead stowage bin, where the restraint apparatus minimizes the risk of luggage stowed within the bin from falling from the bin when it is opened. Furthermore, there exists a need for such a restraint apparatus that is easily accessible to facilitate the quick removal of stowed luggage.

SUMMARY OF THE INVENTION

In accordance with one embodiment of the present invention, a pull-down stowage bin assembly for a vehicle is provided. The pull-down stowage bin assembly includes a frame, a bin coupled to the frame for reciprocating movement between an open position and a stowed position, and a restraint assembly disposed within the bin to selectively restrain objects located within the bin when objects are located in the bin and the bin is in the open position. In accordance with certain other embodiments of the present invention, the restraint assembly includes a door member attached to the bin for selective reciprocating movement between an open position and a closed position.

In another embodiment of the present invention, the pull-down stowage bin assembly includes a limit assembly disposed on the frame and positioned relative to the door member to cause the door member to move into the closed position when the door member is in the open position and the bin is moved from the open position to the stowed position.

In still yet other embodiments of the pull-down stowage bin assembly, the bin assembly includes a retaining mechanism attached to the door member and adapted for locking engagement with a portion of the bin to selectively maintain the door member in the closed position.

In another embodiment of the invention, the surface of the door member is perforated or formed from an open-weave net. This embodiment allows a person unloading the stowage bin to see if there is risk of an article falling from the stowage bin. As a result, a person may take remedial action and reposition the article prior to opening the bin.

In still yet another embodiment of the invention, the retaining mechanism is a wheel mounted on a bracket. The wheel aids in monitoring the amount of articles loaded into the stowage bin. In that regard, the wheel is positioned such that the stowage bin will not close if the stowage bin is overloaded; thus, restricting the door from gliding along the wheel and closing.

BRIEF DESCRIPTION OF THE DRAWINGS

The foregoing aspects and many of the attendant advantages of this invention will become better understood by reference to the following detailed description, when taken in conjunction with the accompanying drawings, wherein:

FIG. 2 is an end view of a restraint apparatus for an overhead pull-down bucket stowage bin formed in accordance with one embodiment of the present invention and showing both the restraint apparatus and stowage bin in a closed position; and FIG. 3 is an end view of a restraint apparatus for an overhead pull-down bucket stowage bin formed in accordance with one embodiment of the present invention and showing the stowage bin in an opened position and the restraint apparatus in both an open and closed position.

DETAILED DESCRIPTION OF THE PREFERRED EMBODIMENT

Figure 1:
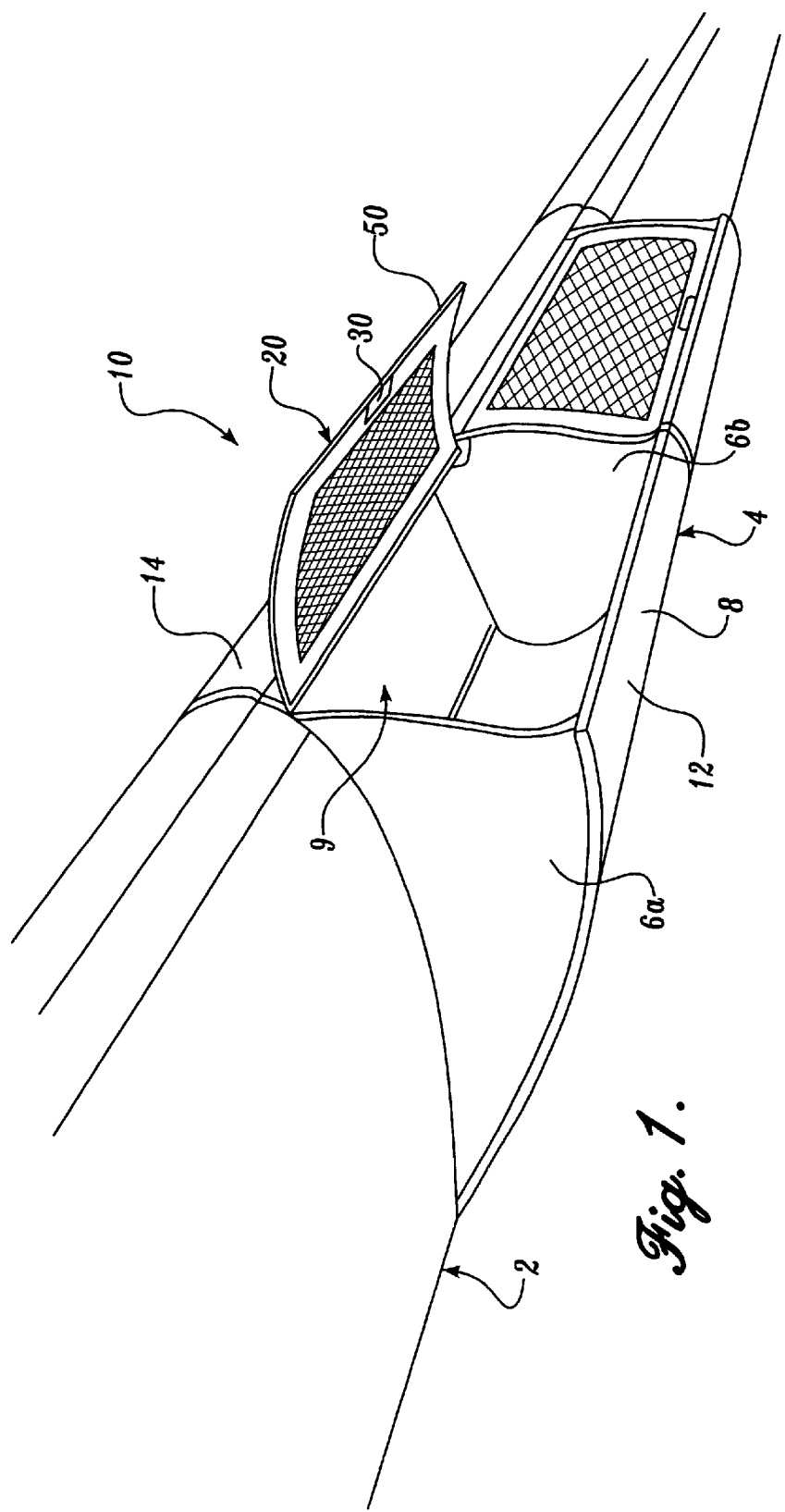
FIG. 1 is an environmental view of a restraint apparatus for an overhead pull-down bucket stowage bin formed in accordance with one embodiment of the present invention.

FIGS. 1–3 illustrate a pull-down stowage bin assembly 10 (hereinafter "bin assembly 10") constructed in accordance with one embodiment of the present invention. The bin assembly 10 is suitably fastened within a passenger compartment of a motor vehicle, such as a bus or an aircraft. Such bin assemblies 10 may be fastened to the ceiling or adjoining structure of the passenger compartment, such that they are positioned above passenger seats located within the passenger compartment. Preferably, such bin assemblies 10 are hingedly attached within the passenger compartment for reciprocating movement between a stowed position 2 and an open position 4. Also, although the bin assemblies are illustrated and described herein as luggage bin assemblies, other types of cargo carrying bin assemblies are also within the scope of the present invention.

The bin assembly 10 includes a frame 11, a stowage bin bucket assembly 12 (hereinafter "bin 12") and a restraint assembly 20. The bin 12 is a well known luggage bin having first and second side walls 6a and 6b disposed at opposite sides of a floor 8. As configured and attached, the side walls 6a and 6b and floor 8 form an opening 9 facing the interior of the passenger compartment when the bin assembly 10 is in the open position.

The restraint assembly 20 includes a door 50 attached to the bin assembly 10 by a pair of pivot hinges 22. Preferably, a pivot hinge 22 is located on each side of the door 50 and extends between the door 50 and one of the sidewalls 6a and 6b of the bin assembly 10. In some applications, the use of one pivot hinge 22 may be sufficient to secure the door 50 to the bin assembly 10. It is also preferred that the pivot hinges 22 are designed to automatically open the door 50 when the door 50 is released from the retaining mechanism 30. This may be accomplished through the use of a pivot hinge 22 with coil springs, gas springs, or other, similar devices that would cause the door 50 to pivot to an open position when released from the retaining mechanism 30.

Further, although it is preferred that the door 50 of the restraint assembly 20 is hingedly attached to the sidewalls 6a and 6b, other types of attachments, such as slidably attaching the restraint assembly 20 within the bin assembly 10, are also within the scope of the present invention.

The door 50 is sized and configured such that it substantially covers the opening 9 and it does not encroach upon the capacity of the bin assembly 10. The door 50 may be made from any of a variety of various materials strong enough to retain stowed items located within the bin assembly 10. Examples of such materials include perforated materials, mesh materials, opaque materials with a clear window suitable for permitting the user to view into the bin assembly 10, or any other material that allows the user to view inside the bin assembly 10 when the bin assembly 10 is in the open position and the door 50 is in the closed position. Alternatively, the door 50 may be constructed from a lightweight, solid material.

The bin assembly 10 also includes a retaining mechanism 30 and a travel limit assembly 40 mounted to a bin shroud 14 located within the bin assembly 10.

The retaining mechanism 30 is suitably positioned in the bin assembly 10, such that a portion of the retaining mechanism 30 is located on the forward lip of the floor 8 and another portion is located on the lower edge surface of the door 50 of the restraint assembly 20. While the type of retaining mechanism 30 is not important to the current embodiment of the present invention, it is important that the retaining mechanism be selectively actuable between a locked and unlocked position.

As a nonlimiting example, the retaining mechanism 30 may be a latch-type device. In this example, the retaining mechanism 30 includes a hook 32 located on the lower end of the door 50 and a catch (not shown). The hook 32 is positioned to be received within the catch located on the lower lip of the floor 8. Optionally, the catch may be located in one or both of the sidewalls 6a and 6b or in the shroud 14. The retaining mechanism 30 should be easy to release and in certain embodiments, allow the door 50 to automatically open when released.

As seen best by referring to FIGS. 2 and 3, the limit assembly 40 includes a polyurethane wheel 42 journaled to a bracket 44 on an axle 46. The wheel 42 also acts as a cam follower positioned for engagement and travel against a cam surface 24 attached in the door 50. The limit assembly 40 is positioned within the bin assembly 10, such that when both the bin assembly 10 and the door 50 are in the open position, the wheel 42 of the limit assembly 40 limits the upward travel of the restraint assembly 20. Further, the limit assembly 40 may automatically displace the restraint assembly 20 into the closed position when the restraint assembly 20 is in the open position and the bin assembly 10 is moved from the open position to the stowed position.

The foregoing aspects of the restraint assembly 20 may be best understood by first referring to FIG. 3, wherein both the door 50 of the restraint assembly 20 and the bin 12 are in the open position. As noted above, the limit assembly 40 is seated against the restraint assembly 20 to limit the upward travel of the restraint assembly 20. As the bin 12 is swung upwardly into the stowed position, the restraint assembly 20 impinges against the roller 42, thereby swinging the restraint assembly 20 downwardly into the closed position, as seen in FIG. 2. Although a wheel 42 is preferred for the limit assembly 40, other mechanisms suitable for permitting the restraint assembly 20 to rest against it and limit travel while also allowing the restraint assembly 20 to slide against it when the bin assembly 10 is displaced into the stowed position, are also within the scope of the present invention.

In operation, when the bin assembly 10 is in the stowed position, the restraint assembly 20 rests against the limit assembly 40, and is secured in the retaining mechanism 30. As the bin 12 is moved from the stowed to the open position, the restraint assembly 20 moves together with the bin 12. When a user wishes to obtain entrance into the bin assembly 10, the retaining mechanism 30 is opened, thereby allowing the door 50 to open until it rests against the limit assembly 40 and restricts the restraint assembly 20 from hitting the shroud 14. When the user wishes to close the bin 12, the restraint assembly 20 will either close automatically upon moving the bin 12 from the open to the stowed position, as described above, or may be manually pulled closed. The restraint assembly 20 is guided back to the closed position and is locked in the retaining mechanism 30.

Although only a few exemplary embodiments of this invention have been described in detail above, those skilled in the art will readily appreciate that many modification are possible without materially departing from the novel teachings and advantages of this invention. Accordingly, all such modifications are intended to be included within the scope of this invention as defined in the following claims. In the claims, any means-plus-function clauses are intended to cover the structures described herein as performing the recited function, in that only structural equivalents, but also equivalent structures.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A pull down stowage bin assembly for a vehicle, comprising:
   (a) a frame;
   (b) a bin coupled to the frame for reciprocating movement between an open position and a stowed position, the bin sized and constructed to receive objects;
   (c) a restraint assembly disposed within the bin to selectively restrain objects located within the bin when objects are located in the bin and the bin is in the open position, wherein the restraint assembly comprises a door member attached to the bin for selective reciprocating movement between an open position and a closed position; and
   (d) a limit assembly disposed on the frame and positioned to bias the restraint assembly into the closed position and to limit travel of the door member during reciprocating movement of the door member between the open and closed positions.

2. The pull down stowage bin assembly of claim 1, further comprising a retaining mechanism attached to the door member and adapted for locking engagement with a portion of the bin to selectively maintain the door member in the closed position.

3. The pull down stowage bin assembly of claim 1, wherein the limit assembly being disposed on the frame and positioned relative to the door member to cause the door member to move into the closed position when the door member is in the open position and the bin is moved from the open position to the stowed position.

4. The pull down stowage bin assembly of claim 3, wherein door member includes a cam surface and the limit assembly comprises a cam follower engaging with said cam surface.

5. A pull down luggage bin assembly for a vehicle, comprising:
  (a) a frame adapted to be mounted within a vehicle;
  (b) a stowage bin bucket assembly coupled to the frame for selective reciprocating movement of the stowage bin bucket assembly between an open position for receiving objects and a stowed position;
  (c) a restraint assembly swingingly attached to the stowage bin bucket assembly for reciprocating movement between an open position and a closed position, the restraint assembly adapted to selectively restrain objects within the stowage bin bucket assembly when objects are located within the stowage bin bucket assembly and the stowage bin bucket assembly is in the open position, wherein the restraint assembly comprises a door member attached to the stowage bin bucket assembly for selective reciprocating movement between the open and closed positions; and
  (d) a limit assembly disposed on the frame and positioned to bias the restraint assembly into the closed position and to limit travel of the door member during reciprocating movement of the door member between the open and closed positions.

6. The pull down luggage bin assembly of claim 5, further comprising a retaining mechanism attached to the door member and adapted for locking engagement with a portion of the stowage bin bucket assembly to selectively maintain the door member in the closed position.

7. The pull down luggage bin assembly of claim 5, the limit assembly being disposed on the frame and positioned relative to the door member to displace the door member into the closed position when the door member is in the open position and the stowage bin bucket assembly is moved from the open position to the stowed position.

8. The pull down stowage bin assembly of claim 7, wherein door member includes a cam surface and the limit assembly comprises a cam follower engaging with said cam surface.

9. A pull down luggage bin assembly for a vehicle, comprising;
  (a) a frame adapted to be mounted within a vehicle;
  (b) a stowage bin bucket assembly coupled to the frame for selective reciprocating movement of the stowage bin bucket assembly between an open position for receiving objects and a stowed position;
  (c) restraint means for selectively restraining objects when objects are located within the stowage bin bucket assembly and the stowage bin bucket assembly is in the open position, wherein the restraint means is attached to the stowage bin bucket assembly for reciprocating movement of the restraint means between an open position and a closed position; and
  (d) a limit assembly disposed on the frame and positioned relative to the restraint means to displace the restraint means into the closed position when the restraint means is in the open position and the stowage bin bucket assembly is moved from the open position to the stowed position, wherein the limit assembly is positioned relative to the restraint means to limit travel of the restraint means during reciprocating movement of the restraint means between the open and closed positions.

10. The pull down luggage bin assembly of claim 9, wherein the restraint means is hingedly attached to the stowage bin bucket assembly.

11. The pull down luggage bin assembly of claim 9, further comprising a retaining mechanism attached to the restraint means and adapted for locking engagement with a portion of the stowage bin bucket assembly to selectively maintain the restraint means in the closed position.

12. A pull down luggage bin assembly for a vehicle, comprising;
  (a) a frame adapted to be mounted within a vehicle;
  (b) a stowage bin bucket assembly coupled to the frame for selective reciprocating movement of the stowage bin bucket assembly between an open position for receiving objects and a stowed position;
  (c) restraint means for selectively restraining objects within the stowage bin bucket assembly when objects are located within the stowage bin bucket assembly and the stowage bin bucket assembly is in the open position, the restraint means being pivotally attached the stowage bin bucket assembly for reciprocating movement of the restraint means between an open position and a closed position; and
  (d) a stop secured to a shroud positioned to limit travel of the restraint means and to bias the restraint means into the closed position.

13. The pull down luggage bin assembly of claim 12, further comprising means for automatically displacing the restraint means to the closed position.

* * * * *